United States Patent
Aoyagi et al.

(10) Patent No.: US 11,512,248 B2
(45) Date of Patent: Nov. 29, 2022

(54) METHOD OF PRODUCING BETA-SIALON FLUORESCENT MATERIAL

(71) Applicant: NICHIA CORPORATION, Anan (JP)

(72) Inventors: Kenichi Aoyagi, Itano-gun (JP); Takashi Kaide, Anan (JP); Yuya Takahashi, Myozai-gun (JP); Shoji Hosokawa, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/033,576

(22) Filed: Sep. 25, 2020

(65) Prior Publication Data

US 2021/0095202 A1     Apr. 1, 2021

(30) Foreign Application Priority Data

Sep. 27, 2019 (JP) .............................. JP2019-177138

(51) Int. Cl.
| | |
|---|---|
| *C09K 11/77* | (2006.01) |
| *C01F 17/30* | (2020.01) |
| *C09K 11/08* | (2006.01) |
| *C01B 21/082* | (2006.01) |

(52) U.S. Cl.
CPC ...... *C09K 11/7734* (2013.01); *C01B 21/0826* (2013.01); *C01F 17/30* (2020.01); *C09K 11/0883* (2013.01); *C09K 11/77348* (2021.01)

(58) Field of Classification Search
CPC ............................................. C09K 11/77348
See application file for complete search history.

(56) References Cited

U.S. PATENT DOCUMENTS

| | | |
|---|---|---|
| 3,023,340 A | 2/1962 | Repsher |
| 2007/0108896 A1 | 5/2007 | Hirosaki |
| 2009/0021141 A1 | 1/2009 | Emoto et al. |
| 2010/0053932 A1 | 3/2010 | Emoto et al. |
| 2010/0213820 A1 | 8/2010 | Sakai et al. |
| 2010/0219741 A1 | 9/2010 | Kawasaki et al. |
| 2011/0234118 A1 | 9/2011 | Kim et al. |
| 2012/0305844 A1 | 12/2012 | Emoto et al. |
| 2013/0300014 A1 | 11/2013 | Emoto |
| 2017/0037311 A1 | 2/2017 | Hosokawa et al. |
| 2017/0166810 A1* | 6/2017 | Morikawa .......... C09K 11/7734 |

FOREIGN PATENT DOCUMENTS

| | | |
|---|---|---|
| JP | 2007326981 A | 12/2007 |
| JP | 2010241995 A | 10/2010 |
| JP | 2013173806 A | 9/2013 |
| JP | 2013173868 A | 9/2013 |
| JP | 2014197635 A | 10/2014 |
| JP | 2017036430 A | 2/2017 |
| JP | 2017110206 A | 6/2017 |
| JP | 2017214551 A | 12/2017 |
| JP | 6572373 B1 | 9/2019 |
| WO | 2006093135 A1 | 9/2006 |
| WO | 2008/062781 A1 | 5/2008 |
| WO | 2008062781 A1 | 5/2008 |
| WO | 2009048150 A1 | 4/2009 |
| WO | 2012042957 A1 | 4/2012 |
| WO | 2017104140 A1 | 6/2017 |

OTHER PUBLICATIONS

Mackenzie, Carbothermal synthesis of beta-sialon from mechanochemically activated precursors, Journal of the European Ceramic Society 26 (2006) 209-215 (Year: 2006).
United States Patent and Trademark Office, Non-Final Office Action, issued to U.S. Appl. No. 16/504,937 dated Mar. 2, 2021, 17 pages.
United States Patent and Trademark Office, Final Office Action, issued to U.S. Appl. No. 16/504,937 dated Apr. 20, 2021, 18 pages.
United States Patent and Trademark Office, Non-Final Office Action, issued to U.S. Appl. No. 16/504,937 dated Aug. 5, 2021, 19 pages.
Final Office Action, United States Patent and Trademark Office, issued to U.S. Appl. No. 16/504,937 dated Feb. 2, 2022, 28 pages.

* cited by examiner

*Primary Examiner* — C Melissa Koslow
(74) *Attorney, Agent, or Firm* — Hunton Andrews Kurth LLP

(57) ABSTRACT

Provided a method of producing a β-sialon fluorescent material having excellent emission intensity. The method includes providing a first composition containing aluminum, an oxygen atom, and a europium-containing silicon nitride, heat treating the first composition, contacting the heat-treated composition and a basic substance to obtain a second composition, and contacting the second composition resulting from contacting the heat-treated composition with the basic substance and an acidic liquid medium containing an acidic substance.

21 Claims, No Drawings

METHOD OF PRODUCING BETA-SIALON FLUORESCENT MATERIAL

CROSS-REFERENCE TO RELATED PATENT APPLICATION

This application claims priority to Japanese Patent Application No. 2019-177138, filed on Sep. 27, 2019, the entire disclosure of which is hereby incorporated by reference in its entirety.

BACKGROUND OF THE INVENTION

The present disclosure relates to a method of producing a β-sialon fluorescent material.

Some newly developed light emitting devices include a combination of a light-emitting diode (hereinafter referred to as "LED"), which serves as a light source, and a fluorescent material that is excited by light from the light source and emits light with a hue different from the hue of the light source. Such light emitting devices thus emit lights of various hues due to additive color mixing. Among such fluorescent materials, a fluorescent material containing β-sialon (hereinafter, "β-sialon fluorescent material") is a green fluorescent material that is excited in a broad wavelength range from near-ultraviolet light to blue light, and has a peak emission wavelength in the range of from 520 nm to 560 nm.

A β-sialon fluorescent material has a composition represented by, for example, $Si_{6-z}Al_zO_zN_{8-z}$:Eu ($0<z\leq4.2$). A β-sialon fluorescent material may be obtained as a fired product by mixing silicon nitride ($Si_3N_4$), aluminium nitride (AlN), aluminum oxide ($Al_2O_3$), and europium oxide ($Eu_2O_3$), which serves as an activator, in a predetermined mole ratio, and firing the mixture at around 2000° C. To enhance emission intensity, it has been proposed to carry out heat treatment twice at a high temperature, or to further use a β-sialon fluorescent material obtained through firing as a part of the raw materials (refer to, for example, Japanese Patent Application Publications No. 2007-326981 and No. 2013-173868).

SUMMARY

A first aspect is a method of producing a β-sialon fluorescent material including providing a first composition containing aluminium, an oxygen atom, and a europium-containing silicon nitride, heat treating the first composition, contacting the heat-treated composition and a basic substance to obtain a second composition, and contacting the second composition and an acidic liquid medium containing an acidic substance. According to an embodiment of the present disclosure, the method of producing a β-sialon fluorescent material having excellent emission intensity may be provided.

DETAILED DESCRIPTION

The mode for carrying out the present invention will now be described by means of embodiments and Examples. However, the mode shown below is a mere example of the production method and others for embodying the technical concept of the present invention, and the present invention is not limited to what is described below. The relationship between the color names and the chromaticity coordinates, and the relationship between the wavelength ranges of light and the color names of monochromatic light and others are in accordance with Japanese Industrial Standard (JIS) Z8110. As used herein, the term "step" means not only an independent step but also a step which cannot be clearly distinguished from the other steps but that can achieve the desired object. When a plurality of substances corresponding to a component are present in a composition, the amount of the component means the total amount of the corresponding substances present in the composition unless otherwise specified. A mean particle diameter is a volume median diameter (Dm), which is measured by a pore electrical resistance method based on the Coulter principle. Specifically, a particle size distribution is measured using a particle size distribution measuring device (for example, Multisizer manufactured by Beckman Coulter), and a volume median diameter (Dm) is obtained as a diameter at 50% in the cumulative distribution from a minor diameter side of the particle.

Method of Producing a β-Sialon Fluorescent Material

The method of producing a β-sialon fluorescent material may include providing a first composition containing aluminium, an oxygen atom, and a europium-containing silicon nitride (hereinafter, "providing step"), heat treating the first composition (hereinafter, "first heat treatment step"), contacting the heat-treated composition and a basic substance (hereinafter, "base treatment step") to obtain the second composition, and contacting the second composition resulting from contacting with the basic substance and an acid medium containing an acidic substance (hereinafter, "acid treatment step").

The composition provided in the providing step itself is, for example, formed from β-sialon fluorescent material particles, and heat treating the composition is believed to thermally decompose an unstable phase, such as a low crystallinity portion, contained in the fluorescent material particles, and generate a thermally decomposed product, such as silicon. Contacting the heat-treated composition containing the thermally decomposed product and the fluorescent material particles with a basic substance causes, for example, reaction between the thermally decomposed product and the basic substance, and turns then into a highly translucent solubilized product, such as alkali metal silicate. This is believed to enhance emission intensity. Such a solubilized product may be easily dissolved and removed by being contacted with an acidic liquid medium. The base treatment by contacting with a basic substance is further believed to cause less damage to the β-sialon fluorescent material particles than acid treatment with hydrofluoric acids, and presumably further enhance emission intensity. Contacting with an acidic liquid medium subsequent to the contact with a basic substance is believed to remove microparticles including impurities, which are believed to be generated with the contact with a basic substance, contributing to further enhancement of emission intensity. The impurities may be, for example, a compound containing europium. Such impurities may interfere with emission from the β-sialon fluorescent material, and their removal is believed to further enhance emission intensity.

Providing Step

In the providing step, a composition containing aluminium, an oxygen atom, and a europium-containing silicon nitride may be provided. The composition to be provided is, for example, a silicon nitride in which aluminium, an oxygen atom, and europium are solid-solubilized, and has a composition represented by, for example, formula (I) below.

$$Si_{6-z}Al_zO_zN_{8-z}:Eu \qquad (I)$$

In the formula, z satisfies $0<z\leq4.2$.

The composition may be provided by, for example, selecting a desired composition from commercially available products, or by producing a desired composition by heat treating a mixture containing desired raw materials in accordance with a common method.

In producing a composition in the providing step, a desired composition may be obtained by heat treating, for example, a mixture containing an aluminium compound, a europium compound, and a silicon nitride (hereinafter, "mixture containing raw materials").

The mixture containing raw materials may contain at least one aluminium compound, at least one europium compound, and at least one silicon nitride. Examples of the aluminium compound include oxides, hydroxides, nitrides, oxynitrides, fluorides, and chlorides containing aluminium. In place, at least partially, of the aluminium compound, a simple aluminium metal or an alloy of aluminium may be used. Specific examples of the aluminium compound include aluminium nitride (AlN), aluminum oxide ($Al_2O_3$), and aluminum hydroxide ($Al(OH)_3$), and using at least one selected from the group consisting of these compounds is preferable. One of such aluminium compounds may be used alone, or two or more of them may be used in combination.

The aluminium compound to be used as a raw material may have an average particle diameter of, for example, from 0.01 μm to 20 μm, and preferably from 0.1 μm to 10 μm. The aluminium compound may have a purity of, for example, 95% by weight or more, and preferably 99% by weight or more.

Examples of the europium compound include oxides, hydroxides, nitrides, oxynitrides, fluorides, and chlorides containing europium. In place, at least partially, of the europium compound, a simple europium metal or an alloy of europium may be used. Specific examples of the europium compound include europium oxide ($Eu_2O_3$), europium nitride (EuN), and europium fluoride ($EuF_3$), and using at least one selected from the group consisting of these compounds is preferable. One of such europium compounds may be used alone, or two or more of them may be used in combination.

The europium compound to be used as a raw material may have an average particle diameter of, for example, from 0.01 μm to 20 μm, and preferably from 0.1 μm to 10 μm. The europium compound may have a purity of, for example, 95% by weight or more, and preferably 99.5% by weight or more.

The silicon nitride is a silicon compound containing a nitrogen atom and a silicon atom, or may be a silicon nitride containing an oxygen atom. When the silicon nitride contains an oxygen atom, the oxygen atom may be contained in the form of a silicon oxide, or in the form of an oxynitride of silicon. The oxygen atom content of silicon nitride may be, for example, less than 2% by weight, and may be 1.5% by weight or less. The oxygen atom content may be also, for example, 0.3% by weight or more, and may be 0.4% by weight or more. The silicon nitride may have a purity of, for example, 95% by weight or more, and preferably 99% by weight or more.

The silicon nitride may have an average particle diameter of, for example, from 0.01 μm to 15 μm, and preferably from 0.1 μm to 5 μm.

The mixture containing raw materials may contain silicon nitride that is at least partially replaced by silicon in the form of a single substance, and/or by another silicon compound, such as silicon oxide. In other words, the mixture containing raw materials may contain, in addition to silicon nitride, silicon in the form of a single substance, or another silicon compound, such as silicon oxide, or the mixture containing raw materials may contain, in place of silicon nitride, silicon in the form of a single substance, or another silicon compound, such as silicon oxide. Examples of the silicon compound include silicon oxide, silicon oxynitride, and silicate.

The mixing ratio of the aluminium compound, the europium compound, and the silicon nitride in the mixture containing raw materials may be, when expressed in terms of, for example, the mole ratio of the silicon atom to the aluminium atom (Si:Al) in the mixture containing raw materials, (6-z):z where $0 < z \leq 4.2$, and preferably $0.01 < z < 1.0$. The mole ratio of the total amount of the silicon and aluminium atoms to the europium atom ((Si+Al):Eu) may be, for example, from 6:0.001 to 6:0.05, and preferably from 6:0.003 to 6:0.02.

The mixture containing raw materials may further contain a separately prepared β-sialon fluorescent material as appropriate. When the mixture containing raw materials contains a β-sialon fluorescent material, its amount in the total mixture containing raw materials may be, for example, from 1% by weight to 50% by weight.

The mixture containing raw materials may further contain a flux, such as halide, as appropriate. A flux when contained in the mixture containing raw materials may promote reactions among the raw materials, and further promote more uniform solid phase reaction, resulting in a fluorescent material with a larger particle diameter and superior emission properties. This is probably because, for example, the heat treatment temperature in the providing step is approximately the same or higher than the liquid phase generation temperature of, for example, a halide, which is a flux. Examples of the halide include chlorides or fluorides of rare-earth metals, alkali earth metals, or alkali metals. The flux may be added in the form of a compound in an amount to satisfy the cation element ratio of the target composition, or may be added after the amounts of the raw materials are adjusted to satisfy the target composition. When the mixture containing raw materials contains a flux, the flux content of the mixture containing raw materials is, for example, 20% by weight or less, and preferably 10% by weight or less. The flux content is also, for example, 0.1% by weight or more.

The mixture containing raw materials may be obtained by weighing desired raw material compounds in a desired compounding ratio, and then mixing the raw material compounds by using a ball mill, or a mixing machine, such as a Henschel mixer or a V-blender, or a mortar and a pestle. The mixing may be dry mixing, or wet mixing by adding, for example, a solvent.

The temperature at which the mixture containing raw materials is heat-treated may be, for example, from 1850° C. to 2100° C., preferably from 1900° C. to 2050° C., more preferably from 1920° C. to 2050° C., and still more preferably from 2000° C. to 2050° C. Heat-treating at a temperature of 1850° C. or more may efficiently form a β-sialon fluorescent material, and may facilitate entry of Eu into the crystals, resulting in a desired β-sialon fluorescent material. Heat-treating at a temperature of 2100° C. or less tends to reduce decomposition of the resulting β-sialon fluorescent material.

The atmosphere during heat treatment of the mixture containing raw materials may be preferably a nitrogen gas-containing atmosphere, and more preferably essentially a nitrogen gas atmosphere. When containing nitrogen gas, the atmosphere for heat treating the mixture containing raw materials may contain other gases, such as hydrogen, oxygen, and ammonia in addition to the nitrogen gas. The atmosphere for heat treating the mixture containing raw materials may have a nitrogen gas content of, for example, 90% by volume or more, and preferably 95% by volume or more.

The pressure in the heat treatment of the mixture containing raw materials may be set to, for example, from normal pressure to 200 MPa. To reduce decomposition of the β-sialon fluorescent material to be generated, the pressure is preferably high, and the pressure may be a gauge pressure of preferably from 0.1 MPa to 200 MPa, and more preferably from 0.6 MPa to 1.2 MPa. A pressure within this range would impose less restrictions on industrial equipment.

The mixture containing raw materials may be heat-treated by raising the temperature from, for example, room temperature to a predetermined temperature. The time for raising the temperature may be, for example, from 1 hour to 48 hours, preferably from 2 hours to 24 hours, and more preferably from 3 hours to 20 hours. The time for raising the temperature of 1 hour or more tends to promote sufficient particle growth of the fluorescent material particles, and may facilitate entry of Eu into the crystals of the fluorescent material particles.

The heat treatment of the mixture containing raw materials may have a retention time at a predetermined temperature. The retention time may be, for example, from 1 hour to 48 hours, preferably from 2 hours to 30 hours, and more preferably from 3 hours to 20 hours.

The time for decreasing the temperature from a predetermined temperature to room temperature in the heat treatment of the mixture containing raw materials may be, for example, from 0.1 hour to 20 hours, preferably from 1 hour to 15 hours, and more preferably from 3 hours to 12 hours. During the temperature decrease from the predetermined temperature to room temperature, a retention time at an appropriately selected temperature may be provided. The retention time is adjusted, for example, to further enhance emission intensity of the β-sialon fluorescent material. The retention time at a predetermined temperature during the temperature decrease may be, for example, from 0.1 hour to 20 hours, and preferably from 1 hour to 10 hours. The temperature during the retention time may be, for example, from 1000° C. to less than 1800° C., and preferably from 1200° C. to 1700° C.

The mixture containing raw materials may be heat-treated, for example, in a boron nitride crucible.

After the heat treatment of the mixture containing raw materials, a sizing step including, crushing, pulverizing, and classifying in combination may be provided. Through the sizing step, powder with a desired particle diameter may be obtained. Specifically, the composition, after having been roughly pulverized, may be further pulverized using a common pulverizer, such as a ball mill, a jet mill, and a vibration mill to have a predetermined particle diameter. The final adjustment of the particle diameter may also be made after the first heat treatment step, the base treatment step, and the acid treatment step described later.

First Heat Treatment Step

In the first heat treatment step, the composition provided in the providing step may be heat-treated to obtain a first heat-treated product. In the first heat treatment step, for example, amorphous portions or unstable crystals in the β-sialon fluorescent material are believed to be at least partially decomposed. To enhance emission intensity, the first heat treatment step may be preferably carried out in a rare gas atmosphere or under reduced pressure, and more preferably in a rare gas atmosphere.

The rare gas atmosphere in the first heat treatment step may contain at least one of rare gases, such as helium, neon, and argon, and preferably contains at least argon. The rare gas atmosphere may contain oxygen, hydrogen, and nitrogen in addition to a rare gas. The rare gas content of the rare gas atmosphere may be, for example, 95% by volume or more, and preferably 99% by volume or more.

When the first heat treatment step may be carried out in a rare gas atmosphere, the pressure may be set in the range of, for example, from normal pressure to 1 MPa, and preferably from normal pressure to 0.2 MPa.

The first heat treatment step may be carried out at a pressure lower than normal pressure, or under reduced pressure, and particularly preferably in a vacuum. When the heat treatment is carried out in a vacuum, the pressure may be, for example, 10 kPa or less, preferably 1 kPa or less, and more preferably 100 Pa or less. Under reduced pressure or in a vacuum as used herein does not exclude presence of gas. The gases that may be present include rare gases, nitrogen, hydrogen, and oxygen.

The heat treatment temperature in the first heat treatment step may be, for example, from 1300° C. to 1600° C., and preferably from 1350° C. to 1500° C. The temperature of the first heat treatment step may be preferably lower than the heat treatment temperature of the mixture containing raw materials. This is believed to thermally decompose the unstable crystal phase or the amorphous phase in the fluorescent material particles more efficiently, resulting in more stable fluorescent material particles with a higher crystallinity. The thermally decomposed product generated in the first heat treatment step may contain, for example, silicon in the form of a single substance and a europium compound, and these may be removed by, for example, the base treatment step and the acid treatment step described later.

The heat treatment time in the first heat treatment step may be, for example, from 1 hour to 48 hours, and preferably from 2 hours to 20 hours. In the first heat treatment step, heat treatment may be carried out by, for example, raising the temperature from room temperature to a predetermined temperature. The time for raising the temperature may be, for example, from 1 hour to 48 hours, preferably from 2 hours to 24 hours, and more preferably from 3 hours to 20 hours. In the first heat treatment step, a retention time at a predetermined temperature may be provided. The retention time may be, for example, from 1 hour to 48 hours, preferably from 2 hours to 30 hours, and more preferably from 3 hours to 20 hours.

The time for decreasing the temperature from a predetermined temperature to room temperature in the first heat treatment step may be, for example, from 0.1 hour to 20 hours, preferably 1 hour to 15 hours, and more preferably 3 hours to 12 hours. During the temperature decrease from the predetermined temperature to room temperature, a retention time at an appropriately selected temperature may be provided. The retention time may be adjusted to, for example, further enhance emission intensity of the β-sialon fluorescent material. The retention time at a predetermined temperature during the temperature decrease may be, for example, from 0.5 hour to 20 hours, and preferably from 1 hour to 10 hours. The temperature during the retention time may be, for example, from 800° C. to less than 1600° C., and preferably from 1000° C. to 1400° C.

In the first heat treatment step, the composition provided in the providing step may be heat-treated in the presence of a europium compound. In that case, the composition may be preferably heat-treated in a rare gas atmosphere. Heat-treating the composition provided in the providing step in the presence of a europium compound in a rare gas atmosphere enables efficient production of a β-sialon fluorescent material with a higher emission intensity. This may be understood, for example, in the following manner. When the first heat treatment step is carried out in the presence of a europium compound in a rare gas atmosphere, the europium compound may be at least partially reduced to generate a gaseous product derived from the europium compound. The gaseous product that comes into contact with the composition provided in the providing step is believed to allow europium contained in the composition to be readily reduced to divalent. Also, the gaseous product derived from the europium compound in a reduced state is believed to be incorporated into the composition. These factors are believed to work together to further enhance emission intensity.

Examples of the europium compound to be used in the first heat treatment step include oxides, hydroxides, nitrides, oxynitrides, fluorides, and chlorides containing europium. In place, at least partially, of the europium compound, a simple europium metal or an alloy of europium may be used. Specific examples of the europium compound include europium oxide ($Eu_2O_3$), europium nitride (EuN), and europium fluoride ($EuF_3$). At least one selected from the group consisting of these compounds may be preferable, and europium oxide may be more preferable. One of such europium compounds may be used alone, or two or more of them may be used in combination.

The europium compound to be used in the first heat treatment step may have an average particle diameter of, for example, from 0.01 μm to 20 μm, and preferably from 0.1 μm to 10 μm. The europium compound may have a purity of, for example, 95% by weight or more, and preferably 99.5% by weight or more.

When a europium compound is used in the first heat treatment step, the weight ratio of the europium compound to the composition (100% by weight) provided in the providing step may be, for example, 0.01% by weight or more, preferably 0.05% by weight or more, and more preferably 0.1% by weight or more. Also, the weight ratio may be 50% by weight or less, preferably 20% by weight or less, more preferably 15% by weight or less, and still more preferably 10% by weight or less.

When a europium compound is used in the first heat treatment step, the gaseous product generated from the europium compound may be heat-treated in a manner to come into contact with the composition provided in the providing step. For example, the composition provided in the providing step and the europium compound may be mixed and heat-treated in the same container, or the composition provided in the providing step and the europium compound may be heat-treated in the same container or separate containers without being mixed, or a portion of the europium compound may be mixed with the composition provided in the providing step and heat-treated in the same container as or separate containers from the remaining non-mixed portion of the europium compound. When the composition provided in the providing step and the europium compound are mixed, they may be preferably mixed as homogeneously as possible.

The method of producing a β-sialon fluorescent material may include, subsequent to the first heat treatment step, a step of crushing or pulverizing the resulting first heat-treated product. Crushing or pulverizing treatment may be carried out with the techniques described previously.

Base Treatment Step

In the base treatment step, the heat-treated composition resulting from the first heat treatment step (first heat-treated product) and a basic substance are contacted to obtain a base-treated product. By being contacted with a basic substance, for example, a thermally decomposed product contained in the first heat-treated product, which may affect the emission properties, reacts with the basic substance to turn into a compound that has less effect on the emission properties. This is believed to enhance emission intensity.

Examples of the basic substance include alkali metal hydroxides, such as LiOH, NaOH, KOH, RbOH, and CsOH; alkali metal carbonates, such as $Li_2CO_3$, $Na_2CO_3$, $K_2CO_3$, $Rb_2CO_3$, and $Cs_2CO_3$; hydroxides of Group 2 elements in the periodic table, such as $Mg(OH)_2$, $Ca(OH)_2$, $Sr(OH)_2$, and $Ba(OH)_2$; ammonia ($NH_3$); hydrazine; ethylenediamine pyrocatechol (EDP); and quaternary ammonium compounds, such as tetramethylammonium hydroxide and tetraethylammonium hydroxide. The basic substance may be preferably soluble in water, more preferably the basic substance may contain at least one selected from the group consisting of LiOH, NaOH, KOH, RbOH, CsOH, $Li_2CO_3$, $Na_2CO_3$, $K_2CO_3$, $Rb_2CO_3$, $Cs_2CO_3$, ammonia ($NH_3$), and tetramethylammonium hydroxide, still more preferably may contain at least one selected from the group consisting of alkali metal hydroxides, such as LiOH, NaOH, KOH, RbOH, and CsOH, and ammonia ($NH_3$), and particularly preferably may contain at least NaOH or KOH.

The amount of the basic substance to be contacted with the first heat-treated product may be appropriately selected in accordance with, for example, the type of the basic substance. The weight ratio of the basic substance to the first heat-treated product may be, for example, 0.5% by weight or more, preferably 1% by weight or more, more preferably 5% by weight or more, and still more preferably 8% by weight or more. Also, the weight ratio may be, for example, 200% by weight or less, preferably 100% by weight or less, and more preferably 80% by weight or less. The basic substance with a weight ratio of 0.5% by weight or more tends to satisfactorily react with the thermally decomposed product, and the basic substance with a weight ratio of 200% by weight or less tends to reduce adverse effect on the resulting fluorescent material particles.

The atmosphere of the base treatment step may be, for example, an oxidation atmosphere, such as atmospheric air, or an inert gas atmosphere, such as nitrogen gas or argon gas. The inert gas concentration in the inert gas atmosphere may be, for example, 90% by volume or more, and preferably 95% by volume or more. The pressure in the atmosphere of the base treatment step may be, for example, from 10 Pa to 1 MPa, and preferably from 100 Pa to 0.2 MPa.

The temperature during the base treatment step may be, for example, from 50° C. to 650° C., preferably from 50° C. to 500° C., and more preferably from 70° C. to 400° C. A contact temperature of 50° C. or more tends to improve reactivity between, for example, the thermally decomposed product contained in the first heat-treated product and the basic substance, and thus to further improve productivity. A contact temperature of 650° C. or less tends to reduce adverse effect on the resulting fluorescent material.

The base treatment step may include applying multiple temperature conditions. The base treatment step may include, for example, contacting the first heat-treated product and the basic substance at a first temperature ("first temperature base treatment") and then at a second temperature that is higher than the first temperature ("second temperature base treatment"). Through the first and second base treatments, the reaction between, for example, the basic substance and the thermally decomposed product tends to proceed more efficiently. This also tends to reduce adverse effect on the fluorescent material particles. The first temperature may be, for example, from 50° C. to 150° C., preferably from 60° C. to 140° C., and more preferably from 60° C. to 120° C. The second temperature, which is higher than the first temperature, may be, for example, from 90° C. to 650° C., preferably from 120° C. to 500° C., and more preferably from 150° C. to 400° C.

The duration of contact in the base treatment step may be appropriately selected in accordance with the type of, for example, the basic substance, the weight ratio, and the contact temperature. The duration of contact may be, for example, from 0.1 hour to 48 hours, and preferably from 0.5 hour to 20 hours. When the base treatment step includes the first and second temperature base treatments, the time for the first temperature base treatment may be, for example, from 0.1 hour to 48 hours, and preferably from 0.5 hour to 20 hours. The time for the second temperature base treatment may be, for example, from 0.1 hour to 24 hours, and preferably from 0.5 hour to 12 hours.

The method of contact between the first heat-treated product and the basic substance preferably may include mixing the first heat-treated product and a solution of the basic substance. Using a solution of the basic substance enables more uniform reaction between the first heat-treated product and the basic substance. The solvent in the solution of the basic substance may be selected appropriately from ordinary solvents in which the basic substance may dissolve. Examples of the solvent include water; alcohol, such as methanol, ethanol, and isopropanol; and amines, such as ethanolamine, triethanolamine, and ethylenediamine. One of such solvents may be used alone, or two or more of them may be used in combination. Among these, a solvent containing water may be preferable.

The concentration of the basic substance in the solution may be appropriately selected in accordance with, for example, the type of basic substance and the solvent to be used. The concentration of the basic substance in the solution may be set to, for example, from 0.1% by weight to 80% by weight, and preferably from 1% by weight to 50% by weight.

The base treatment step preferably may include, in addition to mixing the first heat-treated product and a solution of the basic substance, at least partially removing the solvent in the solution. At least partially removing the solvent in the solution tends to further improve reaction efficiency between the basic substance and the thermally decomposed product. When removing the solvent from the mixture of the first heat-treated product and the solution of the basic substance, the removal rate of the solvent may be, for example, 1% by weight or more, preferably 10% by weight or more, more preferably 20% by weight or more, and still more preferably 50% by weight or more.

The solvent may be removed by, for example, heat treatment or decompression treatment, or a combination of these treatments. The technique of removing the solvent only needs not to easily remove the basic substance in the solution together with the solvent, and preferably includes at least heat treatment. When the solvent is removed by heat treatment, the temperature may be preferably about the same as the first temperature.

The base treatment step preferably may include mixing the first heat-treated product and a solution containing the basic substance, contacting the first heat-treated product and the basic substance at the first temperature (first temperature base treatment), and contacting, subsequent to the first temperature base treatment, the first heat-treated product and the basic substance at the second temperature, which is higher than the first temperature (second temperature base treatment), and more preferably, the first temperature base treatment may include at least partially removing the solvent contained in the solution containing the basic substance, and the second temperature base treatment may include heat treating the mixture of the first heat-treated product and the basic substance from which the solvent has been removed at the second temperature. Heat-treating at the second temperature after at least partially removing the solvent at the first temperature tends to allow the reaction between, for example, the thermally decomposed product contained in the first heat-treated product and the basic substance to proceed more uniformly and efficiently.

The time for removing the solvent at the first temperature may be appropriately selected in accordance with the desired solvent removal rate. The time for removing the solvent at the first temperature may be about the same as the time for the first temperature base treatment, and the heat treatment time at the second temperature may be about the same as the time for the second temperature base treatment. The atmosphere during the removal of the solvent at the first temperature may be, for example, either the atmospheric air or an inert gas atmosphere. However, the atmosphere during the heat treatment at the second temperature may be preferably an inert gas atmosphere.

The base treatment step may include a step of crushing or pulverizing the resulting base-treated product. Crushing or pulverizing treatment may be carried out with the techniques described previously.

The base treatment step may further include a washing step of washing the resulting base-treated product with a liquid medium. Washing of the base-treated product may be carried out by, for example, immersing the base-treated product in a liquid medium, stirring as appropriate, and separating the solid from the liquid. Washing may also be carried out by holding the base-treated product in, for example, a funnel, and passing a liquid medium through the funnel. Washing may be repeated or continued until the liquid medium after the solid-liquid separation or the liquid medium having passed through the base-treated product becomes neutral. Further, subsequent to washing with the liquid medium, drying treatment may be carried out as appropriate. Providing a washing step after the base treatment step and before the acid treatment step enables at least partial removal of microparticles contained in the base-treated product.

The liquid medium to be used in the washing step may contain water, and may further contain, in addition to water, a water-soluble organic solvent, for example, alcohol, such as ethanol or isopropanol, as appropriate. Also, the liquid medium may be a neutral liquid medium. Further, the liquid medium may be essentially water. Essentially water as used herein means that the liquid medium may contain unavoidably mixed impurities in an amount of, for example, less than 1% by weight, or less than 0.01% by weight. The temperature of the liquid medium may be, for example, from 5° C. to 95° C., and preferably from 25° C. to 80° C. The time for washing may be, for example, from 0.01 hour to 48 hours, and preferably from 0.1 hour to 20 hours.

Acid Treatment Step

The method of producing a β-sialon fluorescent material may include contacting the base-treated product having undergone the base treatment step with a liquid medium containing an acidic substance to obtain an acid-treated product ("acid treatment step"). Contacting the base-treated product with an acidic liquid medium enables at least partial removal of unnecessary substances, such as alkali metal silicate, contained in the base-treated product. This also enables at least partial removal of microparticles including impurities generated through the base treatment.

The acid treatment may be carried out by, for example, immersing the base-treated product in an acidic liquid medium, stirring as appropriate, and separating the solid from the liquid. The acid treatment may also be carried out by holding the base-treated product in, for example, a funnel, and passing a liquid medium through the funnel. The temperature of the acidic liquid medium to be used in the acid treatment may be, for example, from 5° C. to 95° C., from 20° C. to 80° C., or from 25° C. to 60° C. The time for the acid treatment may be, for example, from 0.01 hour to 48 hours, from 0.1 hour to 20 hours, or from 0.2 hour to 5 hours.

The acidic liquid medium may contain an acidic substance and water, and may further contain a water soluble organic solvent as appropriate. Examples of the acidic substance include hydrogen chloride, nitric acid, and sulfuric acid, and the acidic substance preferably contains at least one selected from the group consisting of these substances. The amount of the acidic substance in the acidic liquid medium may be, for example, from 0.1% by weight to 35% by weight, and may be from 0.1% by weight to 18% by weight, or from 0.1% by weight to 10% by weight.

The amount of the acidic liquid medium to be used for the acid treatment may be, for example, from 100% by weight to 1000% by weight, from 120% by weight to 500% by weight, or from 150% by weight to 300% by weight relative to the base-treated product.

The acid treatment step may further include a step of washing the resulting acid-treated product with a liquid medium. Washing of the acid-treated product may be carried out by, for example, immersing the acid-treated product in a liquid medium, stirring as appropriate, and separating the solid from the liquid. Washing may also be carried out by holding the acid-treated product in, for example, a funnel, and passing a liquid medium through the funnel. Washing may be continued or repeated until the liquid medium after the solid-liquid separation or the liquid medium having passed through the acid-treated product becomes neutral. For the details of the liquid medium to be used in the washing step of the acid treatment step, refer to the liquid medium in the washing step of the base treatment step.

Subsequent to washing with the liquid, a drying step may be provided as appropriate. The drying step may be carried out by, for example, using a hot air drier or a steam drier. The drying temperature may be, for example, from 60° C. to 300° C., or from 80° C. to 150° C. The time for drying may be, for example, from 5 hours to 50 hours, from 8 hours to 30 hours, or from 10 hours to 25 hours.

The β-sialon fluorescent material obtained through the acid treatment step may be improved in luminance compared with the composition before the acid treatment step. The relative luminance of the β-sialon fluorescent material after the acid treatment step to the luminance of the composition before the acid treatment step may be, for example, 100.5% or more or 101% or more, and also, for example, 110% or less or 105% or less.

The β-sialon fluorescent material obtained through the acid treatment step tends to have a greater volume median diameter (Dm) than the composition before the acid treatment step. The ratio of the volume median diameter of the β-sialon fluorescent material after the acid treatment step to the volume median diameter of the composition before the acid treatment step may be, for example, 1.01 or more or 1.02 or more, and also, for example, 1.15 or less or 1.10 or less.

The β-sialon fluorescent material obtained through the acid treatment step tends to have a smaller specific surface area than the composition before the acid treatment step. The ratio of the specific surface area of the composition before the acid treatment step to the specific surface area of the β-sialon fluorescent material after the acid treatment step may be, for example, 1.01 or more. The specific surface area is measured by the one-point BET method using nitrogen gas as adsorption gas.

Second Heat Treatment Step

The method of producing a β-sialon fluorescent material may include, before the first heat treatment step, a step of strongly pulverizing the composition provided in the providing step, and heat treating the composition in a nitrogen atmosphere ("second heat treatment step"). The second heat treatment step enables production of a β-sialon fluorescent material with a still higher emission intensity. This is probably because, for example, crystallinity is improved, and particles with insufficient crystal growth in the composition obtained through the providing step are incorporated into larger particles, and grown into still larger particles.

The strongly pulverized product in the second heat treatment step may have a specific surface area of, for example, 0.20 $m^2/g$ or more, preferably 0.25 $m^2/g$ or more, more preferably 0.28 $m^2/g$ or more, and still more preferably 0.29 $m^2/g$ or more. By pulverizing the composition to have a specific surface area of, for example, 0.20 $m^2/g$ or more, and then re-heat treating the pulverized composition, a β-sialon fluorescent material having a higher relative emission intensity and superior luminance may be obtained. This is probably because, for example, the crystals are rearranged, and the activating element may be easily incorporated into the crystals during the rearrangement.

The strong pulverization in the second heat treatment step may be carried out using, for example, a dry grinder, such as a ball mill, a vibrational mill, a hammer mill, a roll mill, or a jet mill. The composition provided in the providing step may be a powder aggregate in which powders are aggregated with one another. In this case, the composition in the form of a powder aggregate may be preferably crushed or roughly pulverized using, for example, a mortar and a pestle to have an average particle diameter of about 10 μm, specifically, an average particle diameter of above 10 μm to less 100 μm, and then pulverized using, for example, the above-described dry grinder to give a predetermined specific surface area. The average particle diameter of the composition is measured by the air permeability method using a Fisher Sub Sieve Sizer.

The heat treatment temperature in the second heat treatment step may be, for example, from 1800° C. to 2100° C., preferably from 1850° C. to 2040° C., and more preferably from 1900° C. to less than 2040° C.

The atmosphere in the second heat treatment step may be a nitrogen atmosphere containing at least nitrogen gas, and preferably a nitrogen atmosphere essentially composed of nitrogen gas. The atmosphere in the second heat treatment step may contain, in addition to nitrogen gas, other gasses, such as hydrogen, oxygen, and ammonia. The atmosphere in the second heat treatment step may have a nitrogen gas content of, for example, 90% by volume or more, and preferably 95% by volume or more.

The pressure in the second heat treatment step may be set to, for example, from normal pressure to 200 MPa. To reduce decomposition of the β-sialon fluorescent material to be generated, the pressure may be preferably high. Specifically, the pressure in terms of a gauge pressure may be preferably from 0.1 MPa to 200 MPa, and more preferably from 0.6 MPa to 1.2 MPa. A pressure within this range would impose less restrictions on industrial equipment.

Heat-treatment in the second heat treatment step may be carried out by raising the temperature from, for example, room temperature to a predetermined temperature. The time for raising the temperature may be, for example, from 1 hour to 48 hours, preferably from 2 hours to 24 hours, and more preferably from 3 hours to 20 hours. The second heat treatment step may have a retention time at a predetermined temperature. The retention time may be, for example, from 1 hour to 48 hours, preferably from 2 hours to 30 hours, and more preferably from 3 hours to 20 hours.

The time for decreasing the temperature from a predetermined temperature to room temperature in the second heat treatment step may be, for example, from 0.1 hour to 20 hours, preferably from 1 hour to 15 hours, and more preferably from 3 hours to 12 hours. A retention time at an appropriately selected temperature may be provided during the temperature decrease from a predetermined temperature to room temperature. This retention time may be adjusted, for example, to further enhance the emission intensity of the β-sialon fluorescent material. The retention time at a predetermined temperature during the temperature decrease may be, for example, from 0.1 hour to 20 hours, and preferably from 1 hour to 10 hours. The temperature during the retention time may be, for example, from 1000° C. to less than 1800° C., and preferably from 1200° C. to 1700° C.

The second heat treatment step may be carried out in the presence of a europium compound. This tends to further enhance emission intensity. The europium compound may be added when, for example, strong pulverization of the composition is carried out.

Examples of the europium compound to be used in the second heat treatment step include oxides, hydroxides, nitrides, oxynitrides, fluorides, and chlorides containing europium. In place, at least partially, of the europium compound, a simple europium metal or an alloy of europium may be used. Specific examples of the europium compound include europium oxide ($Eu_2O_3$), europium nitride (EuN), and europium fluoride ($EuF_3$). At least one selected from the group consisting of these compounds is preferable, and europium oxide is more preferable. One of such europium compounds may be used alone, or two or more of them may be used in combination.

The europium compound to be used in the second heat treatment step may have an average particle diameter of, for example, from 0.01 μm to 20 μm, and preferably from 0.1 μm to 10 μm. The europium compound may have a purity of, for example, 95% by weight or more, and preferably 99.5% by weight or more.

When a europium compound is used in the second heat treatment step, the mole ratio of the europium compound to the composition provided in the providing step (1 mol) may be, for example, 0.01% by mole or more, preferably 0.05% by mole or more, and more preferably 0.08% by mole or more. The mole ratio may be also 5% by mole or less, preferably 1% by mole or less, more preferably 0.5% by mole or less, and still more preferably 0.3% by mole or less.

When the method of producing a β-sialon fluorescent material includes the second heat treatment step, the composition having undergone the second heat treatment may be used for the first heat treatment step. In the method of producing a β-sialon fluorescent material, the second heat treatment step may be repeated multiple times. In that case, the composition having undergone the last second heat treatment may be used for the first heat treatment step.

β-Sialon Fluorescent Material

The β-sialon fluorescent material of the present embodiment, which is obtained by the above-described specific production method, may have a high emission intensity. For example, compared with the β-sialon fluorescent materials produced without undergoing the base treatment and the acid treatment, the emission intensity may be enhanced by 5% or more, 10% or more, or even 50% or more. The β-sialon fluorescent material of the present embodiment, which has a composition represented by the previously shown formula, may contain a trace of an alkali metal element. When the β-sialon fluorescent material contains an alkali metal element, the rate may be, for example, from 0.1 ppm to 1000 ppm, and preferably from 0.1 ppm to 100 ppm.

The β-sialon fluorescent material according to the present embodiment absorbs light from ultraviolet rays to light in the short wavelength region of visible light, and emits light with a peak emission wavelength at a longer wavelength than the peak emission wavelength of the excitation light. Light in the short wavelength region of visible light is mainly in the blue light region. Specifically, the β-sialon fluorescent material according to the present embodiment is excited by light from an excitation light source having a peak emission wavelength in the wavelength range of from 250 nm to 480 nm, and emits fluorescent light having a peak emission wavelength in the wavelength range of from 520 nm to 560 nm. By using an excitation light source having a peak emission wavelength in the wavelength range of from 250 nm to 480 nm, the excitation spectrum of the β-sialon fluorescent material shows a relatively high intensity in that wavelength range, and thus the β-sialon fluorescent material has a high emission efficiency. In particular, an excitation light source to be used preferably has a peak emission wavelength in the range of from 350 nm to 480 nm, and more preferably in the range of from 420 nm to 470 nm.

The β-sialon fluorescent material according to the present embodiment also may have a high crystallinity. A glass body (amorphous), for example, has an irregular structure and a low crystallinity, and thus, unless the reaction conditions are strictly controlled to be uniform in the production process, the component ratio of the fluorescent material is not constant, which may result in, for example, uneven chromaticity. In contrast, the β-sialon fluorescent material according to the present embodiment, which is a powder body or a particle body having at least partially a high crystalline structure, tends to be easily produced or processed. Also, the β-sialon fluorescent material, which may be easily dispersed uniformly in an organic medium, may be easily processed into, for example, a luminescent plastic or a polymeric thin film material. Specifically, the β-sialon fluorescent material may have a crystalline structure of, for example, 50% by weight or more, and more preferably 80% by weight or more. This is a percentage of luminescent crystal phase, and a crystal phase of 50% by weight or more, which enables practically usable emission, is preferable. The emission efficiency thus may increase with an increase in the percentage of crystal phase. This, in turn, further increases emission intensity as well as processability.

The β-sialon fluorescent material according to the present embodiment may have an average particle diameter, in terms of a volume median diameter (Dm) measured by the Coulter principle, of, for example, from 4 μm to 40 μm, and preferably from 8 μm to 30 μm. The β-sialon fluorescent material preferably may contain particles having this average particle diameter at a high frequency. In other words, the particle size distribution may be preferably narrow. A light-emitting device including a β-sialon fluorescent material having a particle size distribution with a narrow half-bandwidth may have less color unevenness and achieve favorable color tones. Also, the light absorption rate and the emission efficiency may increase with an increase in the average particle diameter. Thus, a light-emitting device including a fluorescent material with a large average particle diameter, which has optically superior characteristics, may have an improved emission efficiency.

EXAMPLES

Example 1

Providing Step

Silicon nitride ($Si_3N_4$), aluminium nitride (AlN) partially replaced by aluminum oxide, and europium oxide ($Eu_2O_3$), which serves as a raw material compound, were weighed to have a mole ratio of Si:Al:Eu=5.79:0.21:0.011, and mixed to obtain a first mixture containing raw materials. The mole ratio of aluminium nitride (AlN) and aluminum oxide was AlN:$Al_2O_3$=84:16. The mixture containing raw materials was filled into a boron nitride crucible, and heat-treated at 2030° C. for 10 hours in a nitrogen atmosphere at a pressure of about 0.92 MPa (gauge pressure) to obtain a composition containing a β-sialon fluorescent material.

Second Heat Treatment Step

The resultant composition was roughly pulverized using a mortar and a pestle, and the roughly pulverized composition was then subjected to a first-round pulverization treatment (strong pulverization) for 25 hours using a ball mill including two silicon nitride balls: one with a diameter (Φ) of 20 mm and another with a diameter (Φ) of 25 mm, and a porcelain pot to obtain a pulverized product. In the first-round pulverization, 0.0015 mol of europium oxide ($Eu_2O_3$) relative to 1 mol of the fired product was added and the pulverization treatment was carried out.

The resultant pulverized product was then filled into a boron nitride crucible, and subjected to a first-round heat treatment under the conditions of a nitrogen atmosphere at 0.92 Mpa (gauge pressure), a temperature raising time of 10 hours for raising the temperature to 2000° C., a retention time of 10 hours at a temperature of 2000° C., and a retention time of 5 hours at a temperature of 1500° C. during temperature decrease to room temperature to obtain a heat-treated product. The resultant heat-treated product was then roughly pulverized using a mortar and a pestle, and then subjected to a second-round pulverization treatment by strong pulverization for 25 hours using a ball mill including two silicon nitride balls: one with a diameter (Φ) of 20 mm and another with a diameter (Φ) of 25 mm, and a porcelain pot to obtain a pulverized product. In the second-round pulverization, 0.001 mol of europium oxide ($Eu_2O_3$) relative to 1 mol of the heat-treated product was added, and pulverization treatment was carried out. The resultant pulverized product was subjected to a second-round heat treatment under the same conditions as in the first-round heat treatment of the second heat treatment step to obtain a heat-treated product having undergone the second heat treatment step.

First Heat Treatment Step

The resultant heat-treated product having undergone the second heat treatment step and europium oxide were weight so that the europium oxide had a weight ratio of 0.5% relative to the heat-treated product, and mixed to obtain a mixture. The resultant mixture was heat-treated under the conditions of: heating at a temperature of 1400° C. for 5 hours in an argon atmosphere at normal pressure, followed by temperature decrease to room temperature with a retention time of 5 hours at 1100° C. The mixture was then subjected to pulverization and dispersion treatments to obtain a first heat-treated product.

Base Treatment Step

The resultant first heat-treated product was mixed with a basic solution containing sodium hydroxide in an amount of 33% by weight and pure water in an amount of 67% by weight relative to the first heat-treated product, and heat-treated at 130° C. for 20 hours in the atmospheric air to remove 70% by weight or more moisture to obtain a base-treated product.

Washing Step

The resultant base-treated product was stirred in pure water in an amount of 1000% by weight (10 times) relative to the base-treated product. Washing was then carried out by changing pure water several times, and, subsequent to solid-liquid separation, the base-treated product was dried at 100° C. for 15 hours.

Acid Treatment Step

The acid treatment was carried out by mixing the base-treated product having undergone the washing step and an aqueous solution of hydrogen chloride (with a concentration of 0.1% by weight) in an amount of 150% by weight (1.5 times) relative to the base-treated product, and stirring at normal temperature for 0.5 hour. After that, solid-liquid separation was carried out to obtain an acid-treated product.

Washing Step

The resultant acid-treated product was stirred in pure water in an amount of 1000% by weight (10 times) relative to the acid-treated product. Washing was then carried out by changing pure water several times, and after solid-liquid separation, drying treatment was carried out at 100° C. for 15 hours to obtain a fluorescent material 1.

Example 2

A fluorescent material 2 was obtained through synthesis on almost the same conditions as in Example 1 except that the concentration of the aqueous solution of hydrogen chloride in the acid treatment step was changed to 0.5% by weight.

Example 3

A fluorescent material 3 was obtained through synthesis on almost the same conditions as in Example 1 except that the concentration of the aqueous solution of hydrogen chloride in the acid treatment step was changed to 1% by weight.

Example 4

A fluorescent material 4 was obtained through synthesis on almost the same conditions as in Example 1 except that the concentration of the aqueous solution of hydrogen chloride in the acid treatment step was changed to 3% by weight.

Example 5

A fluorescent material 5 was obtained through synthesis on almost the same conditions as in Example 1 except that the concentration of the aqueous solution of hydrogen chloride in the acid treatment step was changed to 5% by weight.

Example 6

A fluorescent material 6 was obtained through synthesis on almost the same conditions as in Example 1 except that the concentration of the aqueous solution of hydrogen chloride in the acid treatment step was changed to 7% by weight.

Example 7

A fluorescent material 7 was obtained through synthesis on almost the same conditions as in Example 1 except that the concentration of the aqueous solution of hydrogen chloride in the acid treatment step was changed to 18% by weight.

Example 8

A fluorescent material 8 was obtained through synthesis on almost the same conditions as in Example 1 except that the concentration of the aqueous solution of hydrogen chloride in the acid treatment step was changed to 35% by weight.

Example 9

A fluorescent material 9 was obtained through synthesis on almost the same conditions as in Example 1 except that the aqueous solution of hydrogen chloride in the acid treatment step was changed to an aqueous solution of nitric acid with a concentration of 0.1% by weight.

Example 10

A fluorescent material 10 was obtained through synthesis on almost the same conditions as in Example 1 except that the aqueous solution of hydrogen chloride in the acid treatment step was changed to an aqueous solution of nitric acid with a concentration of 3% by weight.

Example 11

A fluorescent material 11 was obtained through synthesis on almost the same conditions as in Example 1 except that the aqueous solution of hydrogen chloride in the acid treatment step was changed to an aqueous solution of nitric acid with a concentration of 7% by weight.

Example 12

A fluorescent material 12 was obtained through synthesis on almost the same conditions as in Example 1 except that the aqueous solution of hydrogen chloride in the acid treatment step was changed to an aqueous solution of sulfuric acid with a concentration of 0.1% by weight.

Example 13

A fluorescent material 13 was obtained through synthesis on almost the same conditions as in Example 1 except that the aqueous solution of hydrogen chloride in the acid treatment step was changed to an aqueous solution of sulfuric acid with a concentration of 7% by weight.

Comparative Example 1

A fluorescent material C1 was obtained through synthesis on almost the same conditions as in Example 1 except that neither the acid treatment step nor the washing treatment after the acid treatment step was carried out.

Comparative Example 2

A fluorescent material C2 was obtained through synthesis on almost the same conditions as in Example 1 except that pure water was used in place of the aqueous solution of hydrogen chloride in the acid treatment step, and no washing treatment was carried out after the acid treatment step.

Evaluation

For each of the resultant β-sialon fluorescent materials, the average particle diameter (Dm, median diameter) and the standard deviation σ log were measured by the pore electrical resistance method (the electrical sensing zone method) based on the Coulter principle using a particle size distribution analyzer (Multisizer by Beckman Coulter). σ log was calculated by the formula below:

$$\sigma \log = (|\log(D1/Dm)| + |\log(D2/Dm)|)/2$$

In the formula, D1 denotes a particle diameter at a cumulative value from the minimum particle side of 15.86%, whereas D2 denotes a particle diameter at a cumulative value from the maximum particle side of 15.86%. Each average particle diameter D was measured by an air permeability method using a Fisher Sub Sieve Sizer.

The emission properties of each fluorescent material were measured using a spectrofluorometer (QE-2000 by Otsuka Electronics). Specifically, each emission spectrum was measured using an excitation light with a wavelength of 450 nm, and for the maximum peak of the resultant emission spectrum, relative emission intensity (%), chromaticity coordinates (x, y), Y value, and peak emission wavelength (nm) were measured. Each relative emission intensity was calculated using the emission intensity of the fluorescent material C1 of Comparative Example 1 as a reference. The peak emission wavelengths of the fluorescent materials were all around 538 nm. The evaluation results are shown in Table 1 below.

TABLE 1

| | Acid treatment | | Particle diameter | | | Emission properties | | | | Relative |
| | Acidic Substance | Concentration (wt %) | D | Dm | σlog | x | y | Y | ENG | luminance |
| --- | --- | --- | --- | --- | --- | --- | --- | --- | --- | --- |
| Example 1 | Hydrogen | 0.1 | 11.2 | 13.8 | 0.294 | 0.366 | 0.615 | 126.5 | 94.6 | 102.7 |
| Example 2 | chloride | 0.5 | 11.0 | 13.8 | 0.299 | 0.366 | 0.615 | 125.5 | 94.6 | 101.9 |

TABLE 1-continued

| | Acid treatment | | Particle diameter | | | Emission properties | | | | Relative |
|---|---|---|---|---|---|---|---|---|---|---|
| | Acidic Substance | Concentration (wt %) | D | Dm | σlog | x | y | Y | ENG | luminance |
| Example 3 | | 1 | 11.0 | 13.5 | 0.280 | 0.366 | 0.615 | 126.1 | 94.1 | 102.4 |
| Example 4 | | 3 | 10.8 | 13.1 | 0.279 | 0.366 | 0.615 | 128.4 | 96.0 | 104.2 |
| Example 5 | | 5 | 10.6 | 13.3 | 0.296 | 0.366 | 0.615 | 125.9 | 94.1 | 102.2 |
| Example 6 | | 7 | 10.8 | 13.2 | 0.296 | 0.366 | 0.615 | 124.9 | 93.3 | 101.4 |
| Example 7 | | 18 | 10.8 | 13.4 | 0.294 | 0.366 | 0.615 | 124.3 | 92.7 | 100.9 |
| Example 8 | | 35 | 10.8 | 13.4 | 0.294 | 0.366 | 0.615 | 124.5 | 93.2 | 101.1 |
| Example 9 | Nitric | 0.1 | 10.6 | 13.3 | 0.277 | 0.366 | 0.615 | 124.4 | 92.9 | 101.0 |
| Example 10 | acid | 3 | 10.6 | 13.3 | 0.270 | 0.366 | 0.615 | 124.9 | 93.3 | 101.4 |
| Example 11 | | 7 | 10.8 | 13.5 | 0.276 | 0.366 | 0.615 | 124.3 | 92.8 | 100.9 |
| Example 12 | Sulfuric | 0.1 | 11.4 | — | — | 0.365 | 0.616 | 123.9 | 92.1 | 100.6 |
| Example 13 | acid | 7 | 10.6 | 13.7 | 0.275 | 0.366 | 0.615 | 125.3 | 93.1 | 101.7 |
| Comparative Example 1 | — | — | 10.2 | 12.8 | 0.307 | 0.365 | 0.616 | 123.2 | 89.9 | 100.0 |
| Comparative Example 2 | — | — | 10.0 | 13.0 | 0.309 | 0.366 | 0.615 | 123.7 | 92.2 | 100.4 |

Carrying out the acid treatment step after the base treatment step was found to improve relative luminance.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A method of producing a β-sialon fluorescent material, the method comprising:
    providing a first composition containing aluminium, an oxygen atom, and a europium-containing silicon nitride;
    heat treating the first composition;
    contacting the heat-treated composition and a basic substance to obtain a second composition; and
    acid-treating the second composition comprising contacting the second composition and an acidic liquid medium containing an acidic substance to obtain an acid-treated product,
    wherein the acidic liquid medium contains water and hydrogen chloride as the acidic substance,
    wherein the acidic liquid medium contains the acidic substance in an amount of from 0.1% by weight to 5% by weight,
    wherein σ log of the β-sialon fluorescent material after the acid treating is a range of 0.279 to 0.299,
    wherein the method further comprises, before heat treating the first composition, strongly pulverizing the first composition with a europium compound to obtain a pulverized product containing the europium compound and heat treating in a nitrogen atmosphere the pulverized product containing the europium compound, and wherein the pulverized product has a specific surface area of 0.20 m²/g or more.

2. The method according to claim 1, wherein the basic substance contains at least one selected from the group consisting of alkali metal hydroxides and ammonia.

3. The method according to claim 1, wherein the contacting of the heat-treated composition and the basic substance is carried out at a temperature of from 50° C. to 650° C.

4. The method according to claim 1, wherein the contacting of the heat-treated composition and the basic substance includes contacting at a first temperature, and contacting at a second temperature that is higher than the first temperature.

5. The method according to claim 1, wherein the contacting of the heat-treated composition and the basic substance includes mixing the heat-treated composition and a solution containing the basic substance and a solvent, and at least partially removing the solvent.

6. The method according to claim 1, wherein the basic substance to be contacted with the heat-treated composition is 0.5% by weight or more relative to the heat-treated composition.

7. The method according to claim 1, wherein the heat treating of the first composition is carried out in presence of a europium compound.

8. The method according to claim 1, wherein the heat treating of the first composition is carried out at a temperature of from 1300° C. to 1600° C.

9. The method according to claim 1, wherein the heat treating of the first composition is carried out in a rare gas atmosphere.

10. The method according to claim 1, wherein the providing of the first composition includes heat treating a mixture containing an aluminium compound, a europium compound, and silicon nitride.

11. The method according to claim 1, wherein the providing of the first composition comprises heat treating a mixture containing raw materials for the first composition in a nitrogen atmosphere.

12. The method according to claim 1, wherein the first composition is represented by a formula:

$Si_{6-z}Al_zO_zN_{8-z}:Eu$, wherein z satisfies $0<z\leq4.2$.

13. The method according to claim 1, wherein the β-sialon fluorescent material obtained by contacting the second composition with acidic liquid medium have a greater volume median diameter than the second composition.

14. The method according to claim 1, wherein a ratio of the volume median diameter of the β-sialon fluorescent material after the acid treating to the volume median diameter of the second composition before the acid treating is 1.01 or more.

15. The method according to claim 1, wherein the β-sialon fluorescent material obtained by contacting the second composition with acidic liquid medium have a smaller specific surface area than the second composition.

16. The method according to claim 1, wherein a ratio of the specific surface area of the second composition before the acid treating to the specific surface area of the β-sialon fluorescent material after the acid treating is 1.01 or more.

17. The method according to claim 1, wherein the β-sialon fluorescent material obtained by contacting the second composition with acidic liquid medium have a smaller σ log than the second composition.

18. The method according to claim 1, wherein the β-sialon fluorescent material obtained by contacting the second composition with acidic liquid medium has improved luminance compared to the second composition.

19. The method according to claim 1, wherein an amount of the acidic liquid medium used in the acid treating is from 100% by weight to 1000% by weight relative to the second composition.

20. The method according to claim 1, the method further comprising washing the acid-treated product with a liquid medium.

21. The method according to claim 1, wherein a mole ratio of the europium compound is 0.01% by mole or more and 5% by mole or less with respect to the first composition.

* * * * *